(12) United States Patent
Costello et al.

(10) Patent No.: US 12,095,816 B2
(45) Date of Patent: Sep. 17, 2024

(54) SECURITY AUDIT AND NOTIFICATION PROCESSING

(71) Applicant: NCR Voyix Corporation, Atlanta, GA (US)

(72) Inventors: Christopher John Costello, Suwanee, GA (US); Matthew Robert Burris, Atlanta, GA (US); Gregory Joseph Hartl, Atlanta, GA (US); Sudip Rahman Khan, Decatur, GA (US)

(73) Assignee: NCR Voyix Corporation, Atlanta, GA (US)

( * ) Notice: Subject to any disclaimer, the term of this patent is extended or adjusted under 35 U.S.C. 154(b) by 821 days.

(21) Appl. No.: 16/696,640

(22) Filed: Nov. 26, 2019

(65) Prior Publication Data

US 2021/0160287 A1    May 27, 2021

(51) Int. Cl.
| | |
|---|---|
| *H04L 9/40* | (2022.01) |
| *H04N 1/44* | (2006.01) |
| *H04N 19/184* | (2014.01) |
| *H04N 21/234* | (2011.01) |

(52) U.S. Cl.
CPC .......... *H04L 63/20* (2013.01); *H04L 63/0861* (2013.01); *H04N 1/4426* (2013.01); *H04N 19/184* (2014.11); *H04N 21/23418* (2013.01)

(58) Field of Classification Search
CPC ........ G08B 13/19608; G08B 13/19613; G08B 13/19671; G06K 9/00335; G06K 9/00362; G06K 9/00771; G06V 20/52; G06V 40/10; G06V 40/20; H04L 63/08; H04L 63/20; H04L 63/0492; H04L 63/0861; H04N 1/4426; H04N 5/77; H04N 5/225; H04N 19/00; H04N 19/184; H04N 21/23418; H04N 1/426
See application file for complete search history.

(56) References Cited

U.S. PATENT DOCUMENTS

| | | | |
|---|---|---|---|
| 10,572,638 B2 * | 2/2020 | Wolf | G07C 9/00571 |
| 2005/0105765 A1 * | 5/2005 | Han | G08B 31/00 |
| | | | 340/541 |
| 2017/0264608 A1 * | 9/2017 | Moore | G07C 9/257 |
| 2018/0107880 A1 * | 4/2018 | Danielsson | G06V 40/165 |
| 2018/0165933 A1 * | 6/2018 | Siminoff | G06V 10/62 |
| 2020/0221054 A1 * | 7/2020 | Carey | H04N 7/181 |

* cited by examiner

*Primary Examiner* — Elton Williams
(74) *Attorney, Agent, or Firm* — Schwegman Lundberg & Woessner, P.A.

(57) ABSTRACT

Security video is captured when one or more individuals are detected as entering a secure area. Actions of the one or more individuals are monitored based on security policies associated with the secure area. Identifiers for the one or more individuals and action identifiers for the actions are recorded in a security log while the one or more individuals remain in the secure area. The security video is stopped when the individuals are detected as exiting the secure area. The security video is linked to entries recorded in the security log. In an embodiment, when a non-compliant action is detected from the actions based on the security policies, a real-time alert is raised, and/or the security video is streamed in real time to a security monitor.

20 Claims, 4 Drawing Sheets

SECURITY AUDIT AND NOTIFICATION PROCESSING

BACKGROUND

Many enterprises have advanced security procedures and technology. The purposes of these security systems are to restrict access to secure/confidential assets to only authorized personnel. The systems provide auditing by logging dates and times that specific individuals gain authorized access to the assets.

However, once an individual obtains authorized access to a designated asset, very few security systems continue to monitor actions taken by the individual with respect to the designated asset or with respect to other assets that are accessible to the individual with that individual's authorized access to the designated asset. That is, other secure assets may be compromised or stolen by the individual when the individual was only permitted to access one of the assets during an authenticated access.

Not only is the above-noted situation problematic to existing security but discovering how an asset that was compromised or stolen is also problematic for existing auditing systems. This is because the audit trail for an authenticated access to a designated asset is typically focused only on actions taken by the individual with respect to the designated asset. As a result, all individuals that authenticated for access to any of the assets have to be investigated to discover where culpability should be assigned.

Additionally, some enterprises have very specific security auditing procedures. Consider a bank where accessing a secured asset requires a process referred to as "dual control." This process requires two people with proper authorization be present and both be watching the asset when the asset is accessed. The current process requires manually maintaining a written log having written entries by both people. The written log is then reviewed at various intervals over a course of a year for compliance with security policies. The written logs may be supplemented with video, but such videos have to be synchronized with the log and then manually viewed while reviewing the logs for violations. In fact, the video is typically only viewed when a secure asset was compromised or stolen; however, there may be multiple security violations that took place before the asset was stolen or the asset may not have been stolen but there were still multiple security violations that took place.

Today, discovering and rectifying security violations are largely manual processes that are fraught with human error (forgetting to make written entries on the log, making incorrect written entries in the log, etc.) and are often incomplete because existing security procedures rely on proper compliance by the employees.

SUMMARY

In various embodiments, methods and a system for security audit and notification processing are presented.

According to an embodiment, a method for security audit and notification processing is presented. An individual is detected as being present within a monitored area. A video is initiated to capture the individual within the monitored area. Policies are obtained that are associated with the monitored area. Biometric features of the individual are derived as detected within the video. An identifier associated with the biometric features and other information identified from the policies are recorded in a security log and indexed the security log to the video.

DETAILED DESCRIPTION

Figure 1:
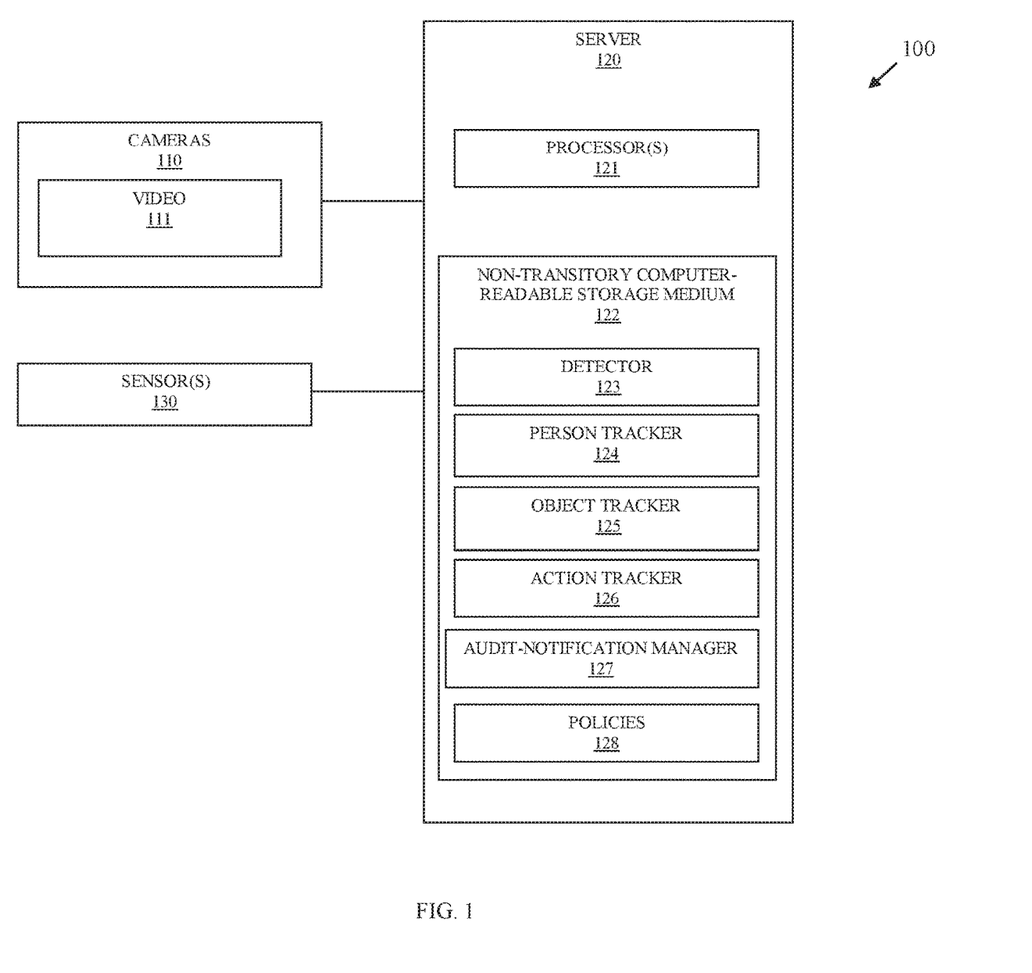
FIG. 1 is a diagram of a system for security audit and notification processing, according to an example embodiment.

FIG. 1 is a diagram of a system 100 for security audit and notification processing according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of security audit and notification processing, presented herein and below.

As used herein and below, the terms "user," "personnel," "actor," "person," "individual," and "subject" may be used interchangeably and synonymously. The terms refer to an individual detected within a secure area or a monitored area where one or more secure assets are present.

The term "area" refers to a predefined area of an enterprise that is being monitored within images captured by cameras in real-time video. The entire area may be monitored through the images of the video frames as well as pre-designated objects (secure assets) within portions of the area. The area may require authentication to access or the area may not require authentication to access but includes assets that are being monitored for auditing, theft-avoidance, or any violation of predefined security policy.

An "object" refers to a secure asset that is being monitored within the images of the video. An object may be a device represented in the images, a log book, a drawer, a desk, a safe, a Point-Of-Sale (POS) terminal, a Self-Service Terminal (SST), an Automated Teller Machine (ATM), a computer monitor, a piece of jewelry, cash, documents, and/or anything of value or having confidential information, etc.

System 100 includes a plurality of cameras 110 that capture time-stamped video of persons and objects in pre-defined areas (herein after just "video 111"). System 100 also includes server 120, and one or more sensor(s) 130. Server 120 includes executable instructions that execute on one or more hardware processors 121 of server 120 from a non-transitory computer-readable storage medium 122 as: detector 123, person tracker 124, object tracker 125, action tracker 126, and audit-notification manager 127. Non-transitory computer-readable-storage medium 122 also includes security policies 128.

The security policies 128 includes statements of secure area identifiers, secure asset identifiers, and conditions that defines rules. Each rule identifying actions for a given secure area and/or secure asset that is permissible, that is required to be performed, and that is impermissible and should not be performed. Each rule may also include a resource identifier or an action that is to be processed when a given rule is violated. The resource associated with the resource identifier may be an automated application, a system, or an electronic contact address of an individual.

It is to be noted that there may be multiple servers 120, such that the different elements 123-127 may execute on a same server 120 or multiple different servers 120 networked together.

Cameras 110 are preconfigured to capture video 111 of the defined areas based on the field-of-view of the lenses of cameras 110. Some of cameras 110 may capture images 111 representing portions of a different area that a different one of the cameras 110 captures video 111 for. That is, each video 111 can include frames that may overlap multiple ones of the defined areas.

Initially, cameras 110 are situated in locations throughout an enterprise (such as a bank but can be other enterprises or even a consumer's home). Each camera lens configured to cover one or more predefined areas of the physical space of the enterprise.

Furthermore, metadata is assigned to each camera 110 to include a unique camera identifier, a location identifier (representing the physical location that camera 110 is situated within the enterprise), and one or more area identifiers (representing the predefined areas that the lens of camera 110 captures in the video 111).

Detector 123 raises an event when a subject or set of subjects is/are detected within a secure area of the enterprise. This can be done in a variety of manners, such as through motion sensors 130 (which may or may not be integrated into cameras 110), through an alert indicating from a security system that authentication was granted to an individual to access a secure area, temperature sensors 130 located within the secure area, etc.

Audit-notification manager 127 listens for the events raised by detector 123 and when detected instructs camera 110 to begin recording video 111 of the secure area. It is noted that the camera 110 may be actively capturing video 111 of the secure area but not recording before receiving the instruction from the manager 127, such that as a configured amount of the video 111 before the raised event is available from cache or memory of the camera 110; the manager 127 when detecting the event instructs the camera 111 to begin streaming the video 111 to server 120. It may also be that the camera 110 has no cache and actively streams video 111 to the server 120 where the server 120 maintains a configured amount in cache or storage but does not record the video 111 until instructed to save and record the video 111 in non-volatile storage of the server 120 by the manager 127.

Each camera 110 provides time stamp and image-frame stamped video 111 to server 120. This video 111 can be streamed over a wired or wireless connection between cameras 110 and server 120 to a commonly accessible storage area on server 120 that is accessible to person tracker 124, object tracker 123, action tracker 126, and audit-notification manager 127.

Each accessible video frame includes its metadata (minimally including what was discussed above) with its video frame on the server 120.

When an event is raised that corresponds to "Subject-Detected" by detector 123, the event is raised and manager 127 causes the video 111 to start recording on server 120. Person tracker 124 also detects the raised event and begins evaluating the video frames being streamed and recorded on the server 120 to identify and track subjects/individuals present in the video frames. Similarly, object tracker 125 and action tracker 126 are activated and begin actively analyzing the video frames. The object tracker 125 tracks predefined objects/assets within the secure area, and the action tracker tracks predefined actions, gestures, poses, and gazes of any identified person/subject being tracked by the person tracker 124. The person tracker 124, object tracker 125, and action tracker 126 may have their own processing rules and pixel templates for tracking or identifying persons, objects, and actions of the individuals from the video frames.

Audit-notification manager 127 upon notification of an event indicating that a person or persons are present in the secure area from detector 123 begins receiving action identifiers and location identifiers for the person or persons and the objects within the secure area from the person tracker 124, object tracker 125, and action tracker 126.

Manager 127 retrieves the appropriate security policies for the secure area and the objects from the policies 128, this may be based on a camera identifier 110 for the camera 110. Manager 127 evaluates the policies in view of the received action identifiers and location identifiers (identifying the location of persons and objects within the secure area and relative to each other). The policies are evaluated to determine if required actions were taken or if non-compliant actions were taken. Each non-compliant action may further include a processing action that manager 127 is to perform, such as sending an alert or a notification to a resource (electronic identifier for personnel, an automated application, and/or a system). The alert or notification may also include additional data that is to be included, such as a real-time link for viewing the video. As actions are taken (compliant or non-compliant), a secure area identifier for the secure area, action identifiers for the actions, identifiers for the tracked objects, and identifiers for the person or persons, are time and date stamped and recorded in a security log associated with the secure area and any secure objects associated with the objects.

When person tracker 124 reports that the person or all persons being tracked have left the secure area, manager 127 instructs camera 110 to stop recording the video 111. The video 111 representing a video clip of activities that took place include the actions when the person or persons were present in the secure area. In an embodiment, the video clip may be compressed and stored on server 120.

Manager 127 then indexes the entries made in the security log to the video clip and links the entries made to the video clip.

One now appreciates how system 100 can be used as a real-time auditing and notification system that can augment or replace traditional auditing procedures of secure areas and secure assets. The personnel/individuals are not required to make manual written entries into security logs as this is achieved with accuracy and without error by system 100. Moreover, non-compliant actions that are deemed severe may have corresponding processing actions embedded in the rules of the policies that cause manager 127 to provide real-time alerts and notifications, such that breaches can be addressed in near real-time by the enterprise.

A variety of scenarios are possible with system 100 some of which but not all of which are now discussed.

Person tracker 124 may be equipped with biometric recognition, such that facial features of the individuals being tracked can be derived from the pixels of the video frames and matched to a registered individual or the enterprise. An enterprise identifier for the individual may then be recorded within the security log with the security log entries.

Person tracker may use biometric recognition to identify an individual uniquely from other individuals and calculate a biometric value from the facial features of the individual. The biometric value may be assigned to a randomly generated identifier and linked to the biometric value. The randomly generated identifier is used by person tracker 124 and written with the security log entries by manager 125 in the security log.

It is noted that other biometric features may be used as well, such as and my way of example only, a fingerprint provided by a security system indicating that the individual was authenticated for access to the secure area, a retina scan, a digit distance and length measurement, a palm reader, a voice print (captured by a microphone), etc. Additionally, features from the video 111 do not have to only include facial features and can include any combination of features or a single set of features associated with the individuals: gait, extremity length, height, and/or facial features.

Detector 123 may report the identifier of an individual based on a separately performed authentication processing that a person performed before access to the secure area was granted. This identifier may be an enterprise identifier for the authenticated person and used by person tracker 124. Manager 124 records the identifier with the secure log entries within the security log.

Manager 170 may embed a reference link to the video clip within the security entries made to the security log for accessing the video clip from the security log.

Manager 127 may utilize a variety of sensors 130 after individuals have left the secure area to check that no object or asset is reporting a condition that requires attention. For example, a safe door of a bank may not have been completely shut when the individual that was in the safe (secure area) was reported as having left the safe. A door sensor 130 can be checked according to the appropriate policy 128 based on an action associated with leaving the secure area. The door sensor 130 reports that the safe door is not completely shut as it should be. The policy 128 may indicate that an alert to the person that was in the safe or another person should return and shut the safe door. The safe door may be associated with a safe of a bank or a safe associated with an individual Automated Teller Machine (ATM), or any secure door.

Action tracker 126 may track actions associated with two individuals and their behaviors, gaze, and distance from one another while in the secure area or in the secure area with a secure asset (object). When the gazes of both individuals are not directed at the asset for both of them, a policy rule may indicate that this is a non-compliant action that requires notation by manager 127 in the security log. Distanced between the individuals and the asset while in the secure area may also be violated. This supports processing for enforcing the "dual control" security policy of many banks.

Some policies 128 can define behaviors or actions taken by a person or asset (object) being tracked, such as holding a key (one object), putting an object in a pocket or bag, leaving with an object, grasping a door handle (another object), sitting in front of a secure monitor, stationary within the secure area for a minimum period of elapsed time, holding something of value, multiple persons in a given secure area, looking in a direction of a specific camera 110, placing a hand on a specific access device/sensor 130, putting an object over or covering a camera 110, etc.

In an embodiment, the secure areas are associated with a Bank and the objects are secure assets or structures within the secure areas.

In an embodiment, the secure areas are associated within any retail or governmental site and the objects are structures or secure assets being tracked.

In an embodiment, manager 127 includes a reporting interface for automatically or custom generating reports for secure area, secure assets, policy violations, specific individuals, etc.

The above-noted embodiments and other embodiments are now discussed with reference to FIGS. 2-4.

Figure 2:
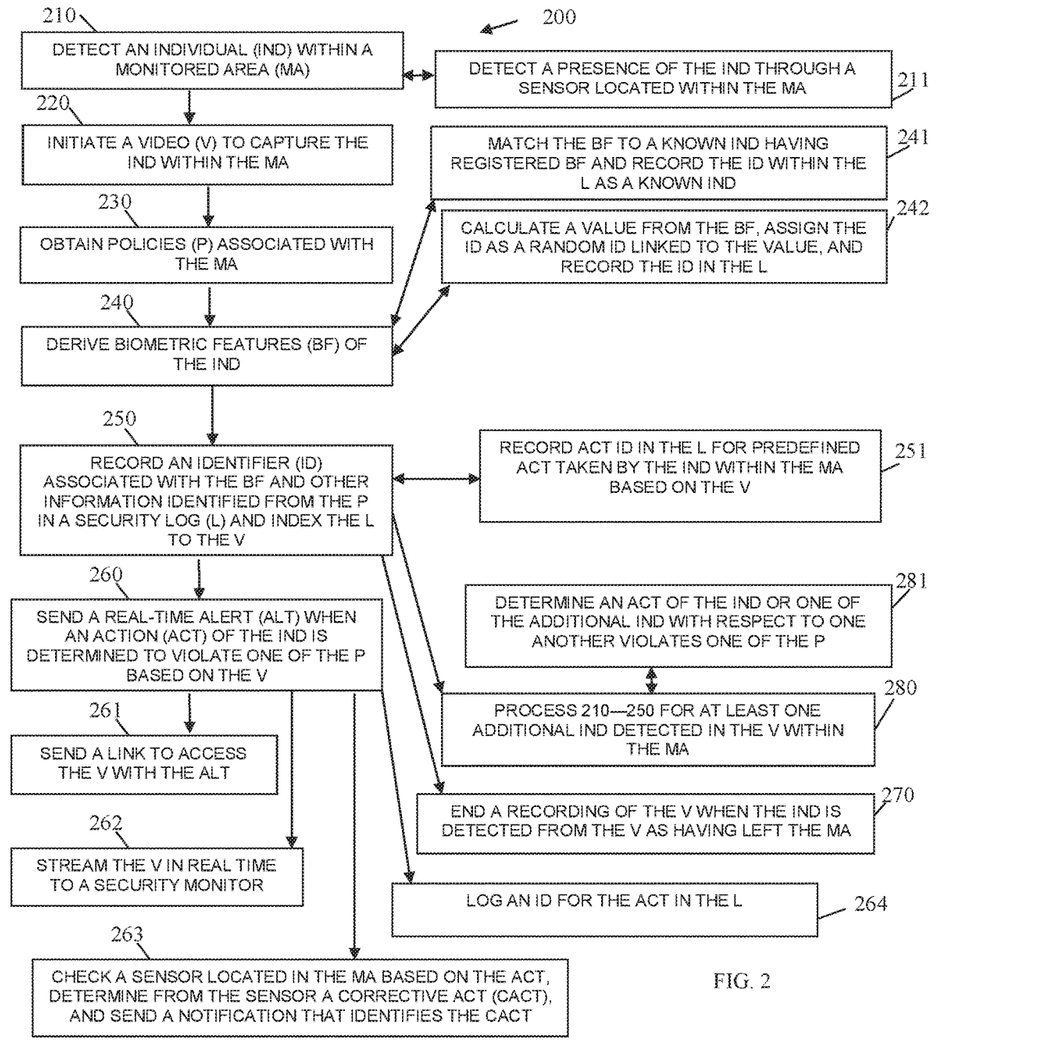
FIG. 2 is a diagram of a method for security audit and notification processing, according to an example embodiment.

FIG. 2 is a diagram of a method 200 for security audit and notification processing, according to an example embodiment. The software module(s) that implements the method 200 is referred to as a "security monitor." The zone monitor is implemented as executable instructions programmed and residing within memory and/or a non-transitory computer-readable (processor-readable) storage medium and executed by one or more processors of a device. The processor(s) of the device that executes the security monitor are specifically configured and programmed to process the security monitor. The security monitor may have access to one or more network connections during its processing. The network connections can be wired, wireless, or a combination of wired and wireless.

In an embodiment, the device that executes the security monitor is server 120. In an embodiment, server 120 is a cloud-based server, a local-area network (LAN)-based server, or a wide-area network (WAN) server.

In an embodiment, the security monitor is all or some combination of: the detector 123, person tracker 124, object tracker 125, action tracker 126, and/or audit-notification manager 127.

At 210, the security monitor detects an individual within a monitored area of an establishment. The monitored area may be indoors or outdoors or both partially indoors and partially outdoors.

In an embodiment, at 211 the security monitor detects a presence of the individual through a sensor located within the monitored area. The sensor may be motion based, heat or temperature based, even based (such as when an authentication of an individual was made by a card swipe or PIN entry into the monitored area), etc.

At 220, the security monitor initiates a video to capture the individual within the monitored area. This may be instructing the camera to begin recording and stream to a server or instructing the server to begin recording streamed video from the camera.

At 230, the security monitor obtains policies associated with the monitored area. The policies are policies 128 discussed above with system 100.

At 240, the security monitor derives biometric features of the individual. This can be based on the video and any combination of features or set of features associated with the individual's: face, gait, extremity lengths, and/or height detected within the video. This may also be acquired from a biometric device or sensor independent of the video, such as a retinal scanner, a palm reader, a fingerprint reader, a voice print (from a microphone), a digit distance and/or length reader, etc.

In an embodiment, at 241, the security monitor matches biometric features to a known individual having registered biometric features and records the identifier within the security log as a known identifier for the individual.

In an embodiment, at 242, the security monitor calculates a value from the biometric features, assigns the identifier as a randomly-generated identifier and links the value to the randomly-generated identifier, and records the identifier in the security log.

At 250, the security monitor records the identifier associated with the biometric features and other information identified from the security policies within the security log and indexes and/or links the security log to the video.

In an embodiment, at 251, the security monitor records action identifiers in the security log for predefined actions taken by the individual within the monitored area based on the video.

In an embodiment, at 260, the security monitor sends a real-time alert when an action of the individual is determined to violate one or the security policies based on the video.

In an embodiment of 260 and at 261, the security monitor sends a link to access the video with the alert.

In an embodiment of 260 and at 262, the security monitor stream the video in real time to a security monitor.

In an embodiment of 260 and at 263, the security monitor checks a sensor located in the monitored area based on the action, determines from the sensor a corrective action is needed, and sends a notification that identifies the corrective action needed to a resource (automated application, electronic address of an individual, a system).

In an embodiment of 260 and at 264, the security monitor logs an identifier for the action in the security log.

In an embodiment, at 270, the security monitor ends a recording of the security video when the individual is detected from the video as having left the monitored area.

In an embodiment, at 280, the security monitor performs the processing of 210-250 simultaneously for at least one additional individual detected in the video within the monitored area with the individual.

In an embodiment of 280 and at 281, the security monitor determines an action of the individual or one of the additional individuals with respect to one another violates one of the security policies.

Figure 3:
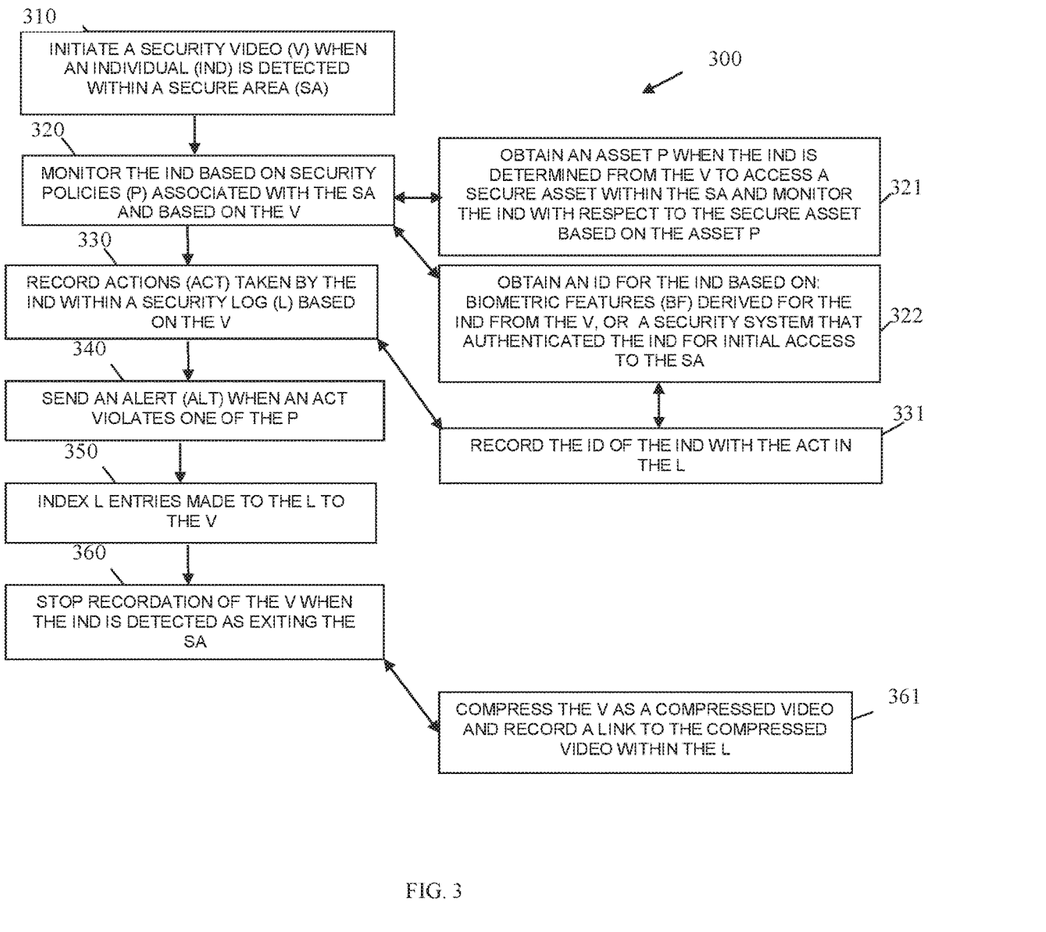
FIG. 3 is a diagram of another method for security audit and notification processing, according to an example embodiment.

FIG. 3 is a diagram of another method 300 for security audit and notification processing, according to an example embodiment. The software module(s) that implements the method 300 is referred to as an "secure area monitor." The secure area monitor is implemented as executable instructions programmed and residing within memory and/or a non-transitory computer-readable (processor-readable) storage medium and executed by one or more processors of a device. The processors that execute the secure area monitor are specifically configured and programmed to process the secure area monitor. The secure area monitor may have access to one or more network connections during its processing. The network connections can be wired, wireless, or a combination of wired and wireless.

In an embodiment, the device that executes the secure area monitor is the server 120. In an embodiment, the server 120 is a cloud processing environment, a LAN server, or a WAN server.

In an embodiment, the secure area monitor is all of or some combination of: detector 123, person tracker 124, object tracker 125, action tracker 126, audit-notification manager 127, and/or the method 300.

The secure area monitor presents another and, in some ways, enhanced processing perspective of the method 300 discussed above.

At 310, the secure area monitor initiates a security video when an individual is detected within a secure area.

At 320, the secure area monitor monitors the individual based on security policies associated with the secure area and based on analysis of the security video.

In an embodiment, at 321, the secure area monitor obtain an asset security policy when the individual is determined from the security video to access the secure asset within the secure area. The secure area monitor monitors the individual with respect to the secure asset based on the asset security policy.

In an embodiment, at 322, the secure area monitor obtains an identifier for the individual based on: 1) biometric features derived for the individual from the security video; or 2) a security system that authenticated the individual for initial access to the secure area.

At 330, the secure area monitor records actions taken by the individual within a security log based on the video.

In an embodiment or 322 and 330, at 331, the secure area monitor records the identifier for the individual with the action in the security log.

At 340, the secure area monitor sends an alert when an action violates one of the security policies. A receiver identifier for a receiver of the alert may be defined within the security policies.

At 350, the secure area monitor indexes and links entries made in the security log to the video.

At 360, the secure area monitor stops recording of the video when the individual is detected as existing or leaving the secure area.

In an embodiment, at 361, the secure area monitor compresses the video as a compressed video and records a link to the compressed video within the security log.

Figure 4:
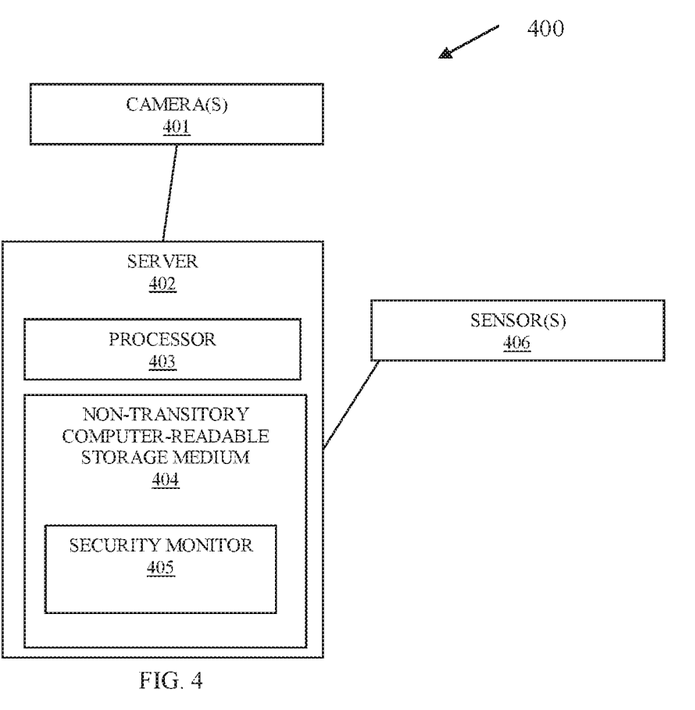
FIG. 4 is a diagram of another system for security audit and notification processing, according to an example embodiment.

FIG. 4 is a diagram of a system 400 for security audit and notification processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes one or more cameras 401, a server 402, and, optionally, one or more sensors 406. The server 402 includes at least one hardware processor 403, a non-transitory computer-readable storage medium 404 having executable instructions representing a security monitor 405.

The security monitor 405 when executed from the non-transitory computer-readable storage medium 404 on the processor 403 is configured to cause the processor 403 to perform processing comprising: 1) initiating the camera 401 to capture a security video clip when an individual is detected as entering the secure area; 2) obtaining security policies assigned to the secure area; 3) monitoring actions of the individual within the security video clip for compliance with the security policies; 4) logging one or more non-compliant actions detected from the actions in a security log; 5) sending a real-time alert based on at least one of the non-compliant actions; 6) terminating the security video clip when the individual is detected as exiting the secure area; and 7) linking the security video clip to entries written in the security log.

In an embodiment, the system 400 further includes one or more sensors 406. The security monitor 405 when executed from the non-transitory computer-readable storage medium 404 on the processor 403 is configured to cause the processor 403 to perform additional processing comprising: 1) checking the at least one sensor 406 when a particular non-compliant action indicates that an asset located within the secure area requires a remedial action; and 2) sending an identifier for the asset and an identifier for the remedial action to a resource for performing the remedial action on the asset.

In an embodiment, the security manager is all of or some combination of: detector 123, person tracker 124, object tracker 125, action tracker 126, audit-notification manager 127, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    detecting an individual present within a monitored area based on a camera that is capturing non-recorded video that is not being recorded within the monitored area, wherein the video is time-stamped video;
    initiating a recording of the video based on the detecting to capture the individual within the monitored area, wherein initiating further includes obtaining a configured amount of the non-recorded video that preceded detection of the individual from a server cache and instructing the camera to start the recording of the video, wherein the camera lacks a cache and streams the video without recording to a server until detection of the individual being present within the monitored area, the configured amount of the non-recorded video obtained from the server cache;
    obtaining policies associated with the monitored area, wherein the policies comprise asset identifiers for assets, action identifiers for actions, and rule identifiers for rules, and wherein the policies define conditions that identify permissible actions with respect to the monitored area and the assets of the secure area and impermissible actions with respect to the monitored area and the assets, wherein the assets comprises one or more of a log book, a drawer, a desk, a safe, a device, a monitor, cash, other non-cash objects of value, and other objects representing confidential information present within the monitored area;
    deriving biometric features of the individual;
    recording an identifier associated with the biometric features, select action identifiers for select permissible actions taken by the individual within the monitored area based on monitoring the individual within the monitored area in view of the policies, select impermissible actions taken by the individual within the monitored area based on the monitoring in view of the policies, rule identifiers for rules processed based on the actions of the individual, and other information identified from the policies in a security log and indexing the security log to the video; and
    generating a compliance report based on recorded video, wherein the compliance report includes a summary of the individual's adherence to the policies associated with the monitored area and details any policy deviations, and wherein the compliance report is stored in association with the security log and the recorded video.

2. The method of claim 1 further comprising, sending a real-time alert when a given action of the individual is determined to violate one of the policies based on the video.

3. The method of claim 2 further comprising, sending a link to access the video with the real-time alert.

4. The method of claim 2 further comprising, streaming the video to a security monitor.

5. The method of claim 2 further comprising, checking a sensor located in the monitored area based on at least one of the actions, determining from the sensor a corrective action is needed, and sending a notification that identifies the corrective action.

6. The method of claim 2 further comprising, logging the select action identifiers for the permissible actions and the impermissible actions in the security log.

7. The method of claim 1 further comprising, ending a recording of the video when the individual is detected from the video as having left the monitored area.

8. The method of claim 1 further comprising, processing the detecting, the initiating, the obtaining, the deriving, and the recording for at least one additional individual detected in the video with the individual within the monitored area.

9. The method of claim 8, wherein processing further includes determining that a specific action of the individual or one of the at least one additional individual with respect to one another within the monitored area violates at least one of the policies from the video.

10. The method of claim 1, wherein detecting further includes detecting a presence of the individual through a sensor located in the monitored area.

11. The method of claim 1, wherein deriving matching the biometric features to a known individual having registered biometric features and recording the identifier within the security log as the known individual.

12. The method of claim 1, wherein deriving calculating a value from the biometric features, assigning the identifier as a random identifier linked to the value, and recording the identifier in the security log.

13. The method of claim 1, wherein recording further includes recording the action identifiers in the security log for predefined actions taken by the individual within the monitored area based on the video.

14. A method, comprising:
initiating a security video when an individual is detected within a secure area wherein initiating further includes determining from video captured but not recorded by a camera when the individual is detected within the secure area, obtaining a configurable amount of the video that preceded detection of the individual from a server cache and instructing the camera to start recording the security video, wherein the camera lacks a cache and streams the video without recording to a server until detection of the individual being present within the secure area, the configured amount of the non-recorded video obtained from the server cache, wherein the security video is time-stamped video;
monitoring the individual based on security policies associated with the secure area and based on the security video;
recording actions taken by the individual within a security log based on the security video, wherein the actions are with respect to assets within the secure area and the assets comprise one or more of a log book, a drawer, a desk, a safe, a device, a monitor, cash, other non-cash objects of value, and other objects representing confidential information present within the monitored area;
sending an alert when an action violates one of the security policies;
indexing security log entries made to the security log to the security video;
stopping recordation of the security video when the individual is detected as exiting the secure area; and
generating an audit report based on recorded video and the security log, wherein the audit report includes time-stamped actions of the individual and any deviations from the security policies, and wherein the audit report is accessible for review in connection with the security log and the recorded video.

15. The method of claim 14, wherein monitoring further includes obtaining an asset security policy when the individual is determined from the security video to access a specific asset within the secure area and monitoring the individual with respect to the specific asset based on the asset security policy.

16. The method of claim 14, wherein monitoring further includes obtaining an identifier for the individual based on: 1) biometric features derived for the individual from the security video or 2) a security system that authenticated the individual for initial access to the secure area.

17. The method of claim 16, wherein recording further includes recording the identifier of the individual with action identifiers for the actions in the security log.

18. The method of claim 14, wherein stopping further includes compressing the security video as a compressed video and recording a link to the compressed video within the security log.

19. A system, comprising:
a camera configured to capture video clips within a secure area, wherein the video clips are time-stamped video clips;
a server comprising a processor and a non-transitory computer-readable storage medium;
the non-transitory computer-readable storage medium comprising executable instructions representing a security monitor;
the security monitor when executed on the processor from the non-transitory computer-readable storage medium causing the processor to perform processing comprising:
initiating the camera to capture a security video clip when an individual is detected as entering the secure area, wherein initiating further includes determining from video captured but not recorded by the camera when the individual is detected within the secure area, obtaining a configurable amount of the video that preceded detection of the individual from a server cache and instructing the camera to start recording the security video clip, wherein the camera lacks a cache and streams the video without recording to the server until detection of the individual being present within the secure area, the configured amount of the non-recorded video obtained from the server cache, wherein the video is time-stamped video;
obtaining security policies assigned to the secure area;
monitoring actions of the individual within the security video clip for compliance with the security policies, wherein the actions are with respect to assets within the secure area and the assets comprise one or more of a log book, a drawer, a desk, a safe, a device, a monitor, cash, other non-cash objects of value, and other objects representing confidential information present within the monitored area;
logging one or more non-compliant actions detected from the actions in a security log;
sending a real-time alert based on at least one of the non-compliant actions;
terminating the security video clip when the individual is detected as exiting the secure area;
linking the security video clip to entries written in the security log; and
generating a compliance report to provide a detailed summary of the individual's interactions with the assets within the secure area and any deviations from the security policies, and wherein the compliance report is stored in association with the security log and the security video clip.

20. The system of claim 19 further comprising, at least one sensor located within the secure area, wherein the security monitor when executed by the processor from the non-transitory computer-readable storage medium is further configured to cause the processor to perform additional processing comprising:
checking the at least one sensor when a particular non-compliant action indicates that an asset located within the secure area requires a remedial action; and
sending an identifier for the asset and an identifier for the remedial action to a resource for performing the remedial action on the asset.

* * * * *